(12) United States Patent
Popowich et al.

(10) Patent No.: US 7,631,450 B2
(45) Date of Patent: Dec. 15, 2009

(54) ADVERTISING DISPLAY FOR PORTABLE STRUCTURE

(75) Inventors: Terrance Popowich, Toronto (CA); Jeremy Miller, Toronto (CA); Ian Hessel, Toronto (CA); Richard Porter, Toronto (CA); Walter Wolanczyk, Toronto (CA)

(73) Assignee: Micro Target Media Holdings Inc. (CA)

(*) Notice: Subject to any disclaimer, the term of this patent is extended or adjusted under 35 U.S.C. 154(b) by 273 days.

(21) Appl. No.: 11/557,603

(22) Filed: Nov. 8, 2006

(65) Prior Publication Data

US 2007/0193097 A1    Aug. 23, 2007

Related U.S. Application Data

(60) Provisional application No. 60/796,541, filed on May 2, 2006, provisional application No. 60/780,869, filed on Mar. 10, 2006, provisional application No. 60/773,641, filed on Feb. 16, 2006, provisional application No. 60/734,750, filed on Nov. 9, 2005, provisional application No. 60/734,767, filed on Nov. 9, 2005, provisional application No. 60/734,766, filed on Nov. 9, 2005.

(51) Int. Cl.
*A47G 1/06* (2006.01)

(52) U.S. Cl. .................. 40/780; 40/603; 40/606.17; 40/732; 40/793

(58) Field of Classification Search .................. 40/376, 40/492, 611.01, 611.06, 611.08, 723, 779, 40/780, 781, 800, 611.02–611.04; 206/470, 206/775, 754
See application file for complete search history.

(56) References Cited

U.S. PATENT DOCUMENTS

| | | | | |
|---|---|---|---|---|
| 190,068 A | * | 4/1877 | Odenbaugh | 40/732 |
| 3,514,886 A | * | 6/1970 | Drakard | 40/766 |
| 3,589,049 A | * | 6/1971 | Cornelius | 40/722 |
| 3,793,756 A | * | 2/1974 | Kay et al. | 40/306 |
| 3,803,738 A | | 4/1974 | Weiss | |
| 3,812,609 A | * | 5/1974 | Volden | 40/780 |
| 4,123,863 A | | 11/1978 | Becker | |
| 4,229,891 A | * | 10/1980 | Keller | 40/653 |
| 4,726,133 A | * | 2/1988 | Rainone et al. | 40/780 |
| 4,805,326 A | * | 2/1989 | Rainone et al. | 40/780 |
| 5,226,251 A | | 7/1993 | Webb | |
| 5,377,434 A | * | 1/1995 | Wilson | 40/611.06 |
| 5,419,134 A | | 5/1995 | Gibson | |

(Continued)

OTHER PUBLICATIONS

PCT International Search Report dated Dec. 16, 2008, for PCT/US08/76977 filed Sep. 19, 2008.

*Primary Examiner*—Lesley D Morris
*Assistant Examiner*—Shin Kim
(74) *Attorney, Agent, or Firm*—Tucker Ellis & West LLP

(57) ABSTRACT

Frame assemblies (10) for displaying sheets of advertising on portable structures such as portable toilets are adapted for durability and ease of use and maintenance. In various embodiments a frame assembly according to the invention may comprise a cover (32) for protecting sheets of advertising, a backing (34) for supporting the sheets, and various types of novel frame members (12). In other embodiments frame assemblies according to the invention can comprise sets (72, 74) of mating frame members (12), the frame members held together, when advertising is installed, at least partly by the interaction of flanges or other portions of the mating members.

19 Claims, 21 Drawing Sheets

U.S. PATENT DOCUMENTS

| | | | |
|---|---|---|---|
| 5,605,354 A * | 2/1997 | Kwon | 281/22 |
| 5,735,069 A | 4/1998 | Gearing | |
| 5,815,971 A | 10/1998 | Rothe et al. | |
| 6,423,402 B1 * | 7/2002 | Ali | 428/304.4 |
| 7,143,535 B1 * | 12/2006 | Cobb et al. | 40/611.08 |
| 2003/0033145 A1 | 2/2003 | Petrushin | |
| 2004/0249650 A1 | 12/2004 | Freedman et al. | |
| 2007/0186165 A1 | 8/2007 | Maislos et al. | |

* cited by examiner

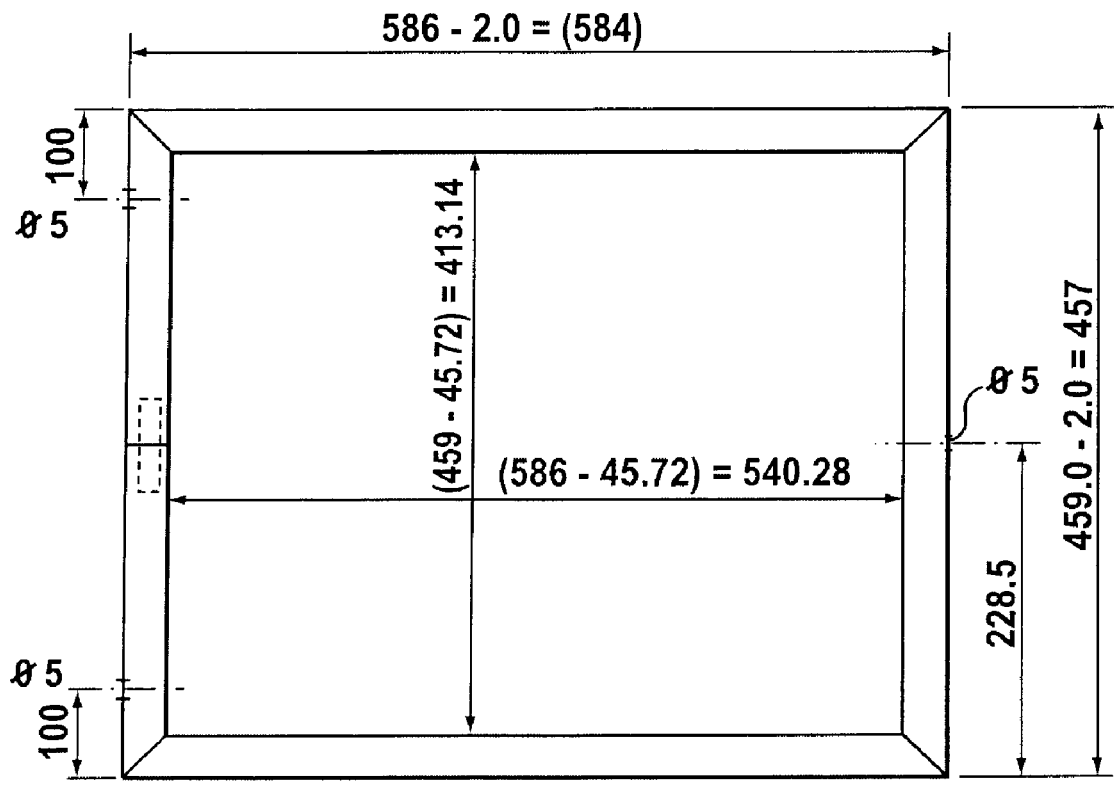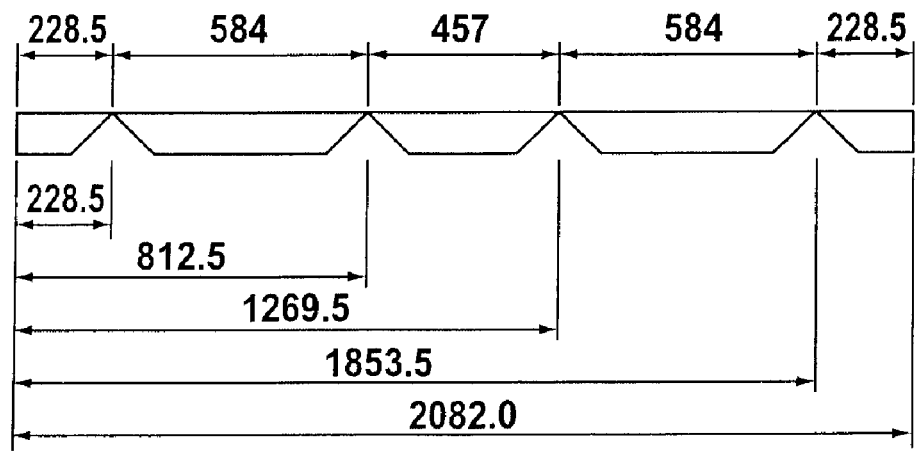
FIG. 19

ADVERTISING DISPLAY FOR PORTABLE STRUCTURE

CROSS-REFERENCE TO RELATED APPLICATIONS

This application claims the priority of, and incorporates in full by this reference, each of the following co-pending provisional patent applications, including all appendices and other documents attached thereto:

60/734,750, entitled ADVERTISING DISPLAY FOR PORTABLE STRUCTURE and filed 9 Nov. 2005;
60/734,767, entitled WRAP-AROUND ADVERTISING DISPLAY and filed 9 Nov. 2005;
60/734,766, entitled METHOD FOR DISPLAY OF ADVERTISING and filed 9 Nov. 2005;
60/773,641, entitled ADVERTISING DISPLAY FOR PORTABLE STRUCTURE and filed 16 Feb. 2006;
60/780,869, entitled METHOD FOR DISPLAY OF ADVERTISING and filed 10 Mar. 2006; and
60/796,541, entitled ADVERTISING DISPLAY FOR PORTABLE STRUCTURE and filed 2 May 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Portable or temporary structures, such as portable toilets, waste bins, trailers, and other movable accommodations provide surfaces that advertisers can use with unique effectiveness to promote their products or services. Advertising in a portable toilet located at a construction site, for example, could reach male consumers in the 18 to 45 year demographic, which has proven to be a difficult group to target.

Movable structures such as portable toilets provide particularly effective devices for the display of advertisements, due to their movable and reusable nature. As is commonly known, such structures can be and commonly are placed temporarily at sporting events, construction sites, and other sites and venues in which people needing the services provided by such structures may be expected to gather.

Affixing advertisements to a portable structure presents challenges, however, whether the advertisement is affixed inside or outside the structure. For example, the portable structures are often made of thick and heavy duty plastic molded into multi-planar surfaces, which makes it difficult find a mono-planar surface to secure advertisements. The advertising material has to be durable to withstand cleaning of the structure, such as by power washing, and has to be capable of remaining affixed in all weather conditions, such in very hot, stormy, or very cold conditions. Furthermore, since the advertising material will generally be outside in an unsupervised location, the advertising material must be tamper-proof and graffiti-proof.

SUMMARY OF INVENTION

The invention relates to advertising, and particularly to methods and apparatus useful for the display of advertising in or on portable or temporary structures, such as portable toilets, waste bins, trailers, and other portable accommodations.

The invention relates to frame assemblies for displaying sheets of advertising on portable structures. In various embodiments a frame assembly according to the invention may comprise a front cover for protecting a sheet of advertising, a backing for supporting the sheet of advertising, at least one frame member having at least one interior channel to support the front cover and backing, and a plurality of openings in at least one frame member for securing the frame to the portable structure. The portable structure may be, for example, a portable toilet or other movable structure. The frame assembly can comprise a plurality of, e.g., four, frame members and a support member, each frame member having miter-cut ends joined together end-to-end to form a plurality of joints, thereby forming a closed, generally planar configuration. Frame assemblies according to the invention can comprise at least one frame member that is removable so that the sheet of advertising can be removed or accessed.

Each frame member can comprise a base portion connected to a rear flange and a front flange, a main channel defined by the rear flange, the front flange, and the base portion, an intermediate flange extending from the base portion intermediate to the rear flange and the front flange. A front channel can be defined by the front flange, the base portion, and the intermediate flange for slidably receiving a sheet of advertising, and a rear channel is defined by the rear flange, the base portion, and the intermediate flange for securing connecting brackets.

In other embodiments frame assemblies according to the invention can comprise sets of mating frame members, the frame members held together, when advertising is installed, at least partly by the interaction of flanges or other portions of the mating members. For example, at least some portions of a first set of frame members can comprise a hinge flange adapted to be retained by a channel provided in the second set of frame members, so that the first set can be rotated with respect to the second set. Other portions of the sets may comprise portions adapted to hold the mating sets in a closed juxtaposition. For example, one or more other members of the first and/or second frame sets may comprise detents or other protrusions adapted for interference fit when the assembled frame sets are placed in a closed disposition.

Frame members according to the invention may be made of anodized aluminum by an extrusion process, or strong, durable plastics, or other strong, durable materials.

An installer can be provided with various component combinations to facilitate rapid and efficient assembly and installation of frames according to the invention; including for example pre-assembled frames comprising top members, side members attached to each end of the top members, and support members, and removable bottom frame members. They may also be provided in disassembled combinations, for assembly at the installation site.

BRIEF DESCRIPTION OF THE FIGURES

The invention is illustrated in the figures of the accompanying drawings, which are meant to be exemplary and not limiting, and in which like references are intended to refer to like or corresponding parts.

FIGS. 18-19 show front views of a frame assembly according to the invention.

DETAILED DESCRIPTION OF THE PREFERRED EMBODIMENTS

Various embodiments of methods, systems, and apparatus according to the invention are described through reference to the Figures.

Figure 1:
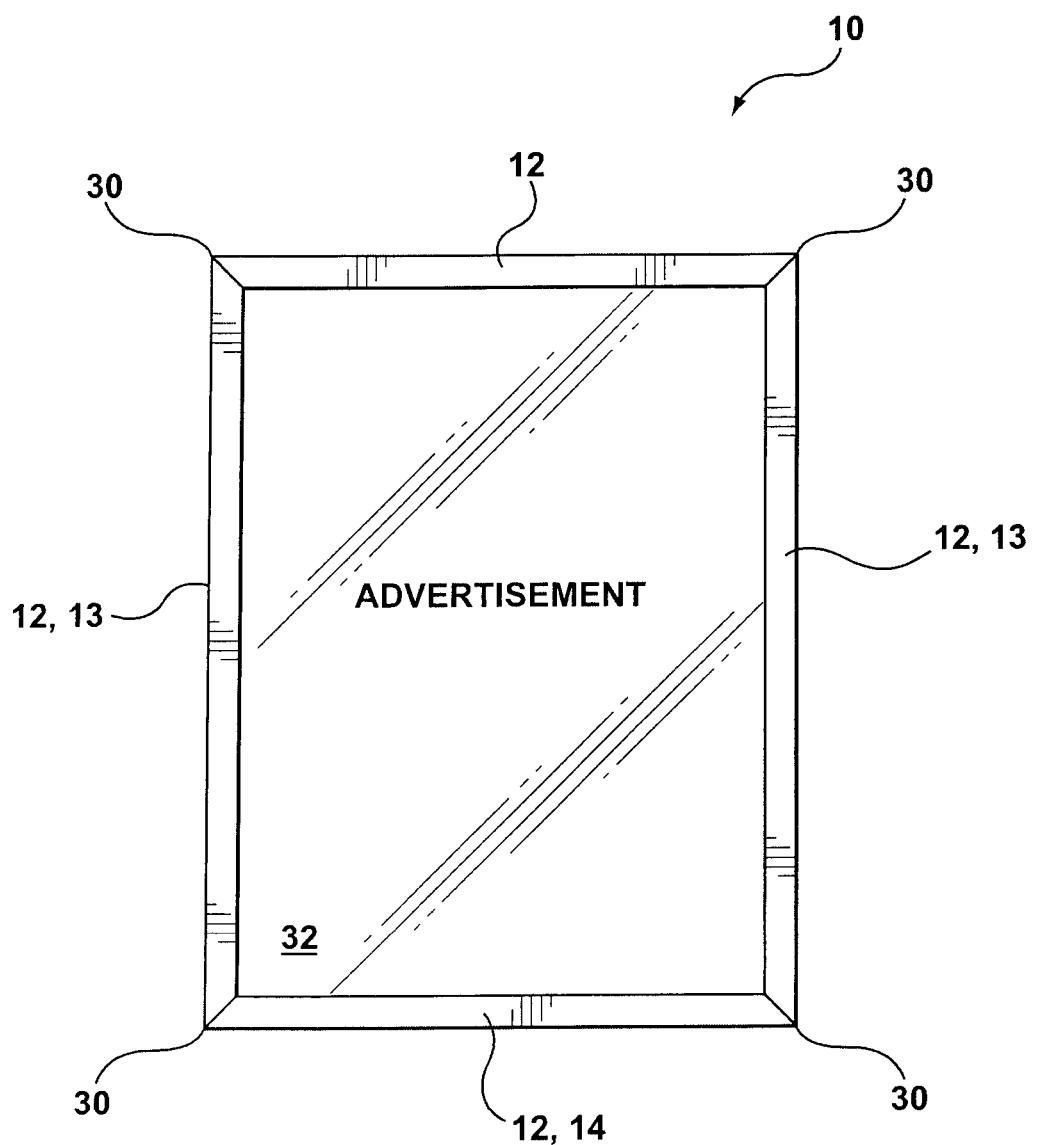
FIG. 1 shows a front view of a frame assembly according to the invention.
Figure 2:
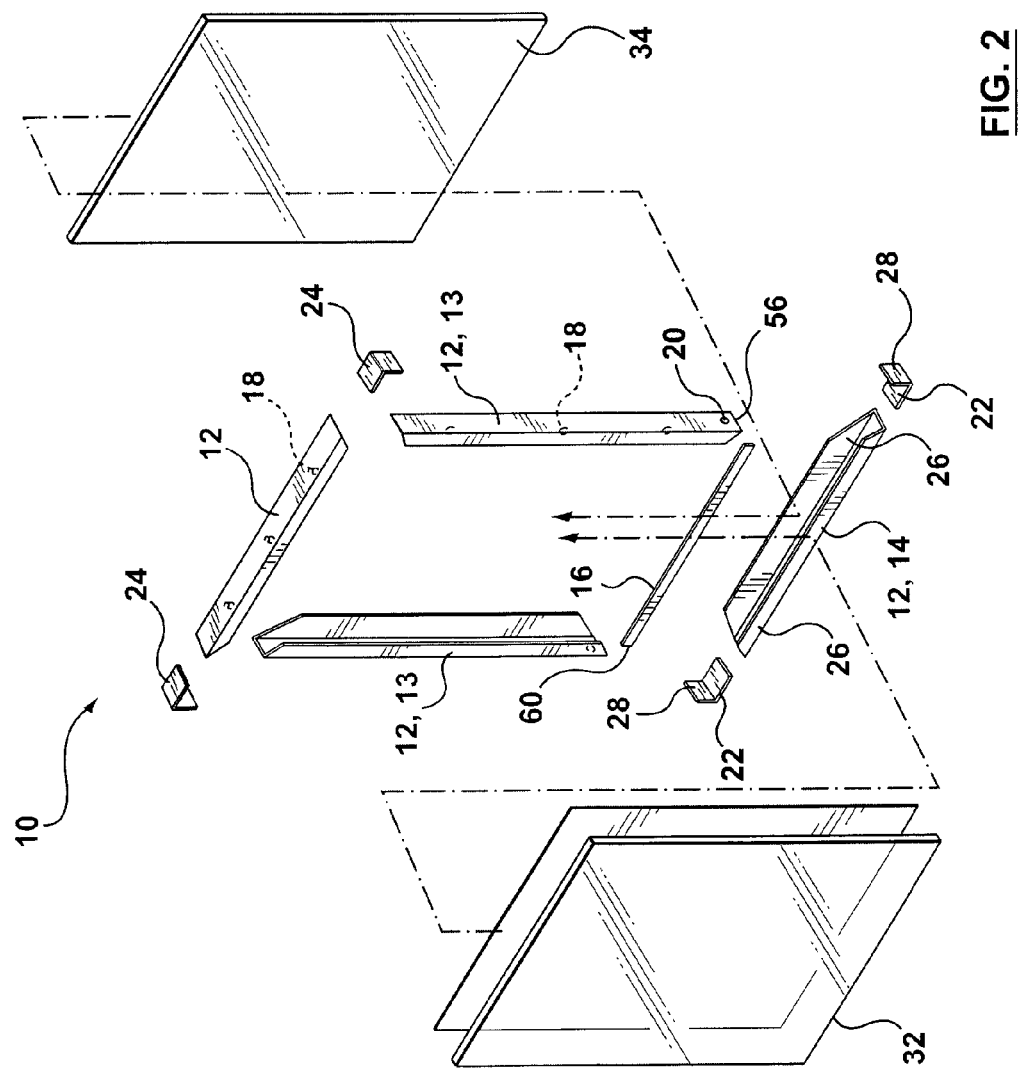
FIG. 2 shows an exploded perspective view of a frame assembly according to the invention.

An embodiment of a frame assembly 10 according to the invention is shown in FIGS. 1 and 2. Frame assembly 10 is adapted for displaying a sheet of advertising on a portable structure such as a portable toilet or other movable structure. In the embodiment shown in FIGS. 1 and 2, frame assembly 10 comprises a front cover 32 for protecting the sheet of advertising, a backing 34 for supporting the sheet of advertising, and a plurality of, in this case four, frame members denoted generally as 12. Frame members 12 are elongate in shape and form the top, sides (frame members 12, 13) and bottom (frame member 12, 14) of frame assembly 10. Frame members 12, 13 meet frame member 12 at the corners of frame assembly 10 to form joints 30.

Front cover 32 may be fabricated using clear material so that an advertisement can be viewed when installed within an assembled frame assembly 10. Front cover 32 may, for example, be fabricated using polycarbonate at a thickness in the range of about 1 mm to about 6 mm, most preferably at a thickness of about 2 mm. The use of such polycarbonate may be advantageous in protecting frame assembly 10 and the advertising material that it contains from vandalism and/or graffiti. Front cover 32 can be treated in a manner to provide further protection from the environment in which the frame is installed. For example, front cover 32 can be UV protected. Optional backing 34 may comprise a material sturdy enough to provide support to an advertisement. A preferred backing material is expanded polyvinyl chloride (PVC) or Coroplast. The thickness of backing 34 can be in the range of about 1 mm to 10 mm, more preferably in the range of about 2 mm to 6 mm. In some presently preferred embodiments, backing 34 is about 3 mm thick.

The advertisement may be printed on synthetic paper using plastic-based synthetic inks, which can be used to produce advertisements that are substantially weatherproof. This printing process may also involve liquid lamination of the advertising sheet, which can result in an advertisement that is substantially waterproof. In many embodiments, it is not essential that both of front cover 32 and backing 34 be included in frame assembly 10, particularly where the advertising sheet is substantially protected from or resistant to the elements in its environment, and stiff enough to be self-supporting. As will be understood by those skilled in the relevant arts, once they have been made familiar with this disclosure, a wide variety of other suitable printing processes are now known, and will doubtless hereafter be developed.

Advertising materials suitable for use with the invention also include images or other information printed or otherwise applied directly onto the front or back of sheets of opaque or translucent materials such as polycarbonate or other plastic. For example, images may be printed or silkscreened on to the back of such translucent materials by a variety of currently known processes, or applied by processes which will doubtless hereafter be developed. It can be advantageous, for example, to apply advertising or other information directly onto the back of a sufficiently rigid and durable plastic sheet, so that an advertising sheet can be installed in a frame assembly 10 without need for separate front cover 32 and/or backing 34. Provision of advertising materials in such form can, for example, significantly reduce the time and effort required for changing of advertising displayed within the frame assembly 10.

Figure 3:
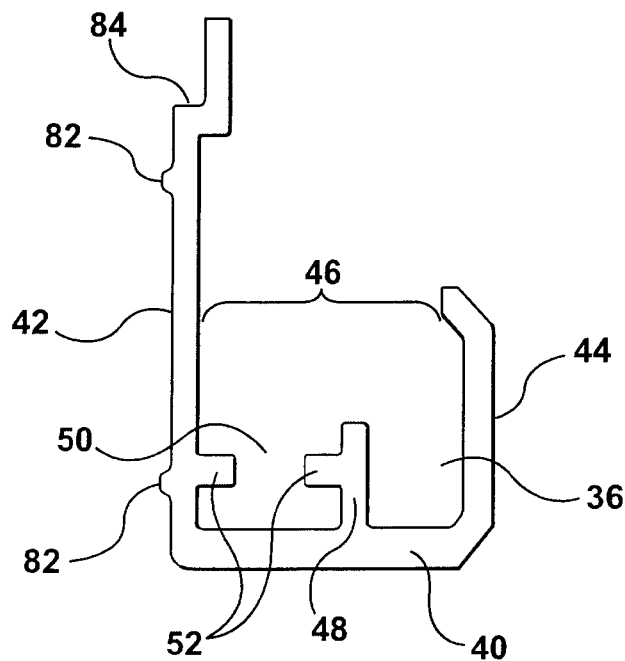
FIG. 3 shows a profile of an extruded frame member according to the invention.

As shown for example in FIGS. 2 and 3, frame members 12 can comprise a base portion 40 connected to a rear flange 42 and a front flange 44, so as to define a main channel 46. Frame members 12 can further comprise intermediate flange an 48 which extends from base portion 40 intermediate to rear flange 42 and front flange 44. Front flange 44, base portion 40, and intermediate flange 48 can define a front channel 36 which can slidably receive and/or support front cover 32 and backing 34. A sheet of advertising may be disposed between front cover 32 and backing 34 and also supported by front channel 36. The sheet of advertising may or may not have the same surface area of front cover 32 or backing 34, however, and may be held in place and supported by front channel 36 or affixed in frame assembly 10 by other means, such as by being adhered to backing 34 and/or front cover 32.

Rear flange 42, base portion 40, and intermediate flange 48 may also define a rear channel 50. Rear channel 50 may be used, for example, for securing connecting brackets as described below, and is also useful for accommodating protrusions, for example, that may extend through rear flange 42.

Rear channel 50 may be further defined by opposing lips 52 which extend from the rear flange 42 and intermediate flange 48. Lips 52 are useful for securing connecting brackets 22 or 24 when frame assembly 10 is assembled, as described further below.

Frame member 12, 14 may form a bottom of frame assembly 10 and may be adapted to accommodate brackets 22 within rear channel 50. Brackets 22 can define openings 28 for removably securing frame member 12, 14 to at least one frame member 12, 13 with for example a fastener 56 through opening 28. Frame member 12, 14 may optionally further define at least one opening 26 in the base portion 40 for allowing drainage.

Frame members 12 may also comprise one or more ridges 82 and/or offset(s) 84 for providing drainage of water and/or cleaning fluids, or for promoting air circulation. As will be apparent to those skilled in the relevant arts, when placed next to a wall of a structure when the frame assembly 10 is mounted flush against the wall, ridges 82 and/or offset(s) 84 will form a space or channel. The space or channel will be suitable to provide drainage and/or circulation.

Frame members 12 may be formed by extrusion or other processes, and are generally made from light, durable materials such as a suitable metal, wood, or plastic. Such materials may be further treated to provide further protection to the material or to generally improve the characteristics of the material. A preferred material is anodized aluminum.

Frame members 12, 13 and optionally 14 may further comprise a plurality of openings 18 (see e.g. FIG. 4) through rear flange 42 for securing the frame to the portable structure with fasteners, such as screws or bolts or by other means. Openings 18 are advantageously located to give the user a choice of surfaces of the portable structure onto which to secure the frame. For example, if it is desired to secure the frame to a surface that has many different planes, it may be suitable to use only one or two openings 18 through which to secure a fastener. In the embodiment shown, frame members 12, 13 each comprise three openings 18 substantially equally placed along the corresponding frame member 12. For maximum strength and stability, it is preferred that about four openings 18 be used to secure frame assembly 10 to the desired structure. A wide variety of fasteners are suitable for use in conjunction with openings 18 in mounting the frame assembly 10. In some presently preferred embodiments, openings 18 accommodate security screw threaded inserts installed by methods known in the art. For example, inserts available under the brand names DKS 130 or DKL 130 may be used. It is preferred that tamper-proof installation screws of any suitable type known in the art may be used.

Frame assemblies 10 may further comprise support members 16 to provide support to the frame assemblies 10 when frame members 12, 14 are not attached thereto. Support members 16 may comprise openings 60 at each end to be used to secure support members 16 to side frame members 12, 13. Frame members 12, 13 can further define openings 62 to be used to secure support member 16. Preferably, support members 16 are comprised of aluminum, but it would be understood in the art that other durable materials would be suitable.

Figure 4:
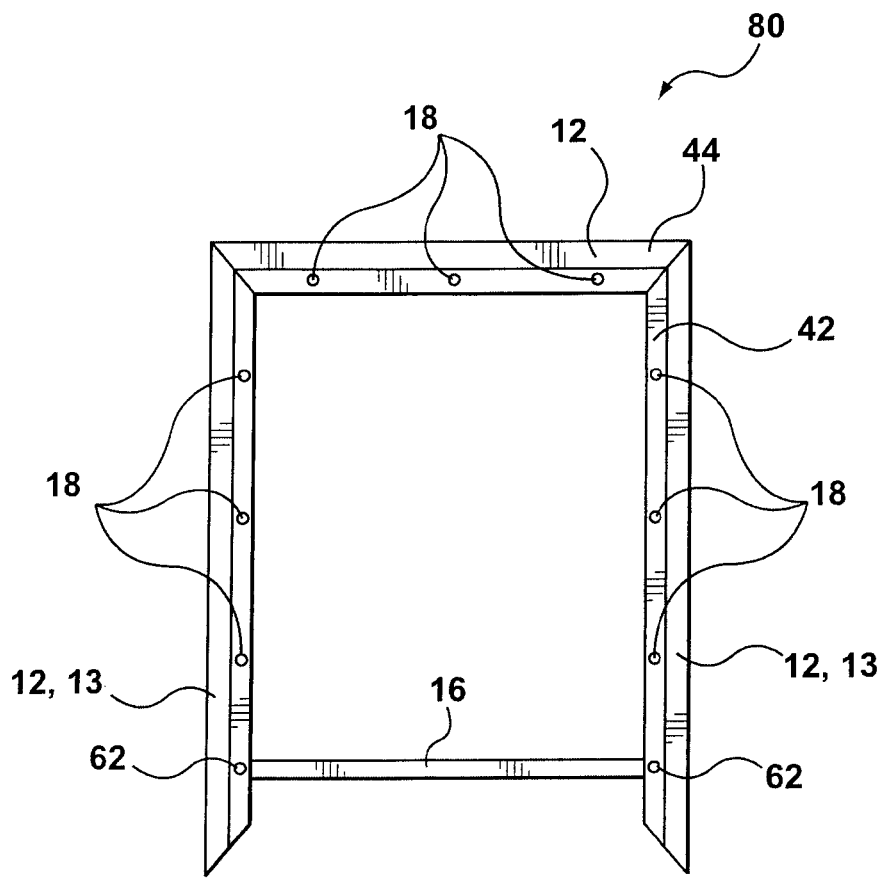
FIG. 4 shows a front view of a pre-assembled portion of a frame assembly according to the invention.

Frame members 12 may be fabricated with mitre-cut or otherwise mating ends, and can be joined together end-to-end to form a plurality of joints 30, thereby forming a closed, generally planar configuration. When assembled, brackets 24 secure frames 12, 13 in an approximately 90 degree configuration. Brackets 24 may be securely crimped in place on frame members 12, or may be secured by other means known in the art. While L-shaped brackets are shown, any type of suitable fastening hardware may be used. When frame members 12 and 12, 13 and support member 16 are secured together, pre-assembled frame 80 as shown in FIG. 4 is the result.

Side frame members 12, 13 can further comprise openings 20 near the bottom of each frame member (see, e.g., FIG. 2). Brackets 22 can be secured to the ends of frame member 12, 14 by crimping or another suitable method. When using the frame assembly, pre-assembled frame 80 is secured to a structure, and then front cover 32, an advertisement, and backing 24 can be slid into preassembled frame 80, either together or separately, using front channel 36 as a guide. Openings 28 of brackets 22 may be used to releasably fasten frame member 12, 14 to frame members 12, 13 by securing a fastener through openings 20 and 28. Preferably, security screws that cannot be opened using a standard screwdriver are used as fasteners. As would be understood in the art, other means of reversibly securing side frame members 12 to frame member 12, 14 may be used. It is preferred to use screws, more preferably, tamper- or security-proof or resistant screws such as a type known in the art. Releasable fastening of frame member 12, 14 to frame members 12, 13 may be used, for example, to facilitate changing of advertising material.

Frame assemblies 10 may be of any sizes suitable for the particular portable structures in which they are intended to be placed. In some currently preferred embodiments, a preferred width for frame assembly 10 is in the range of about 5 inches to about 50 inches, more preferably in the range of about 10 inches to about 40 inches, and even more preferably in the range of about 15 inches to about 25 inches. A particularly preferred width for frame assembly 10 is about 17 inches. A preferred length for some presently preferred embodiments of frame assembly 10 is in the range of about 5 inches to about 50 inches, more preferably in the range of about 10 inches to about 40 inches, and even more preferably in the range of about 15 inches to about 25 inches. A particularly preferred length for frame assembly 10 is about 22 inches.

Figure 5:
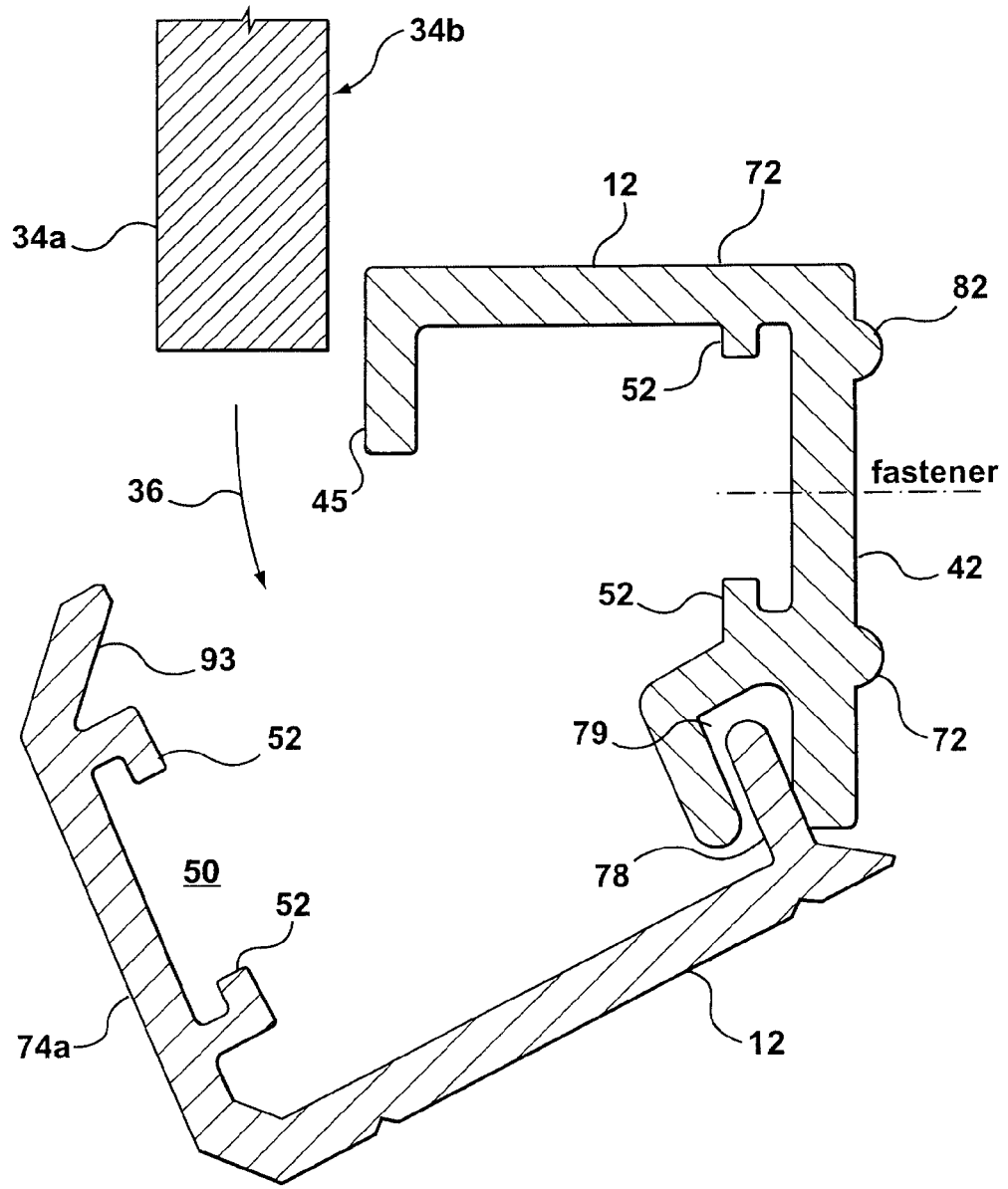
FIGS. 5 and 6 show cross-sectional views of extruded frame members according to the invention, with other frame assembly components.
Figure 6A:
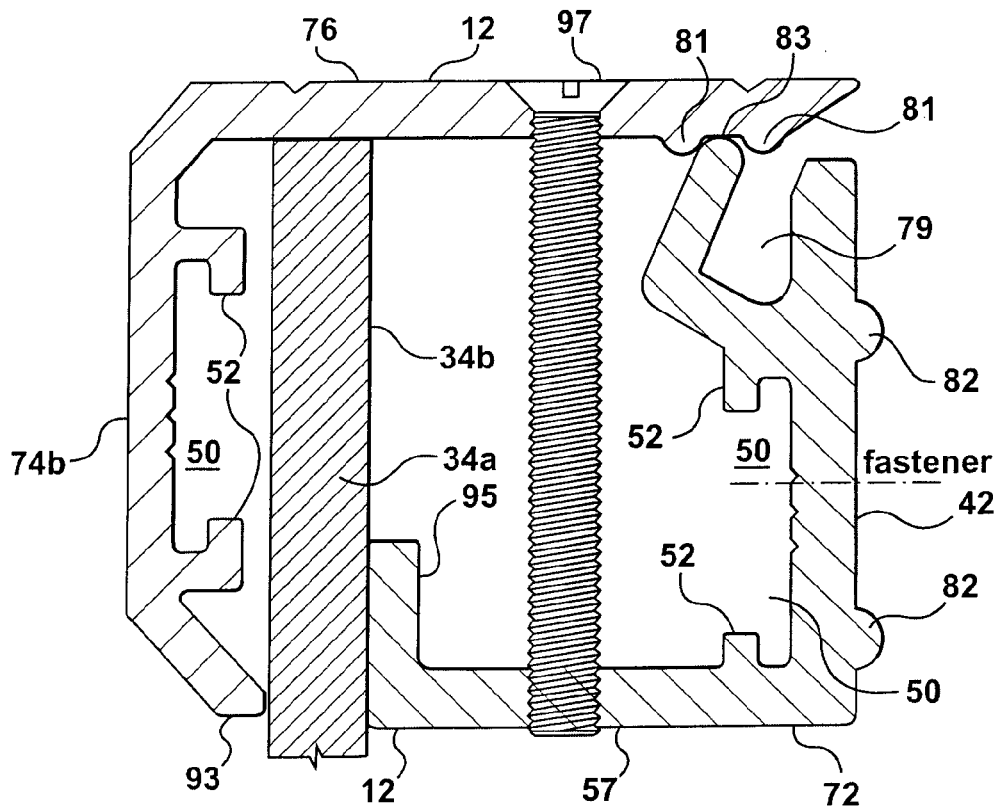
Figure 6B:
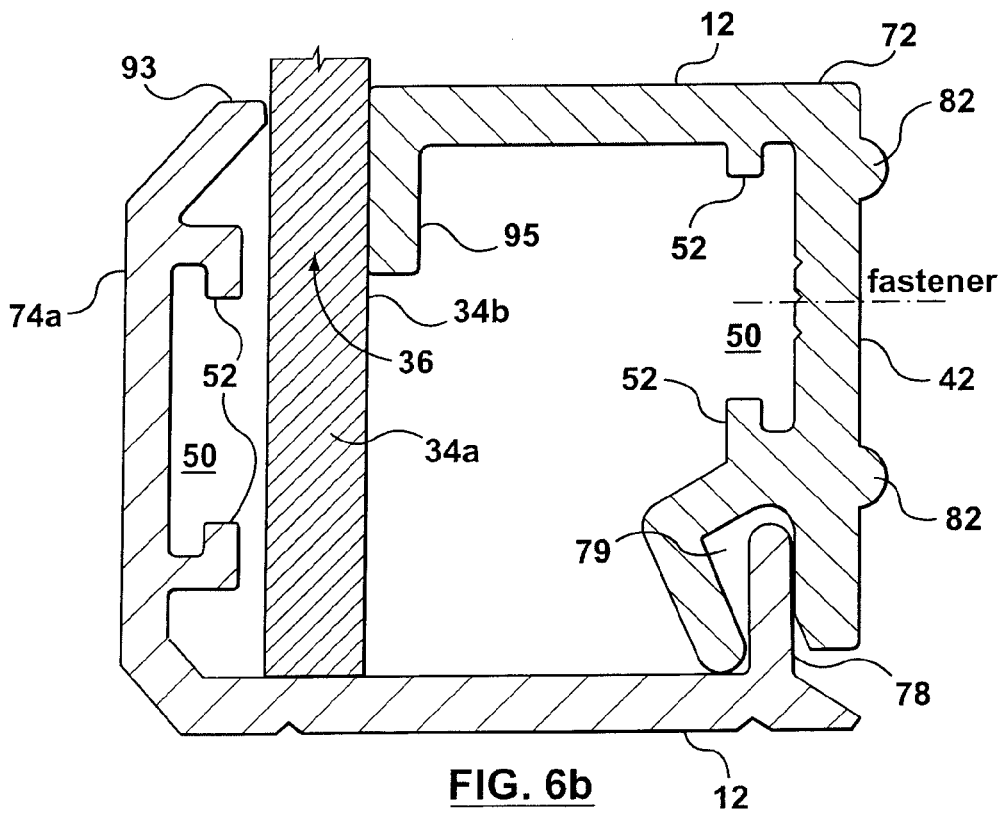
Figure 7:
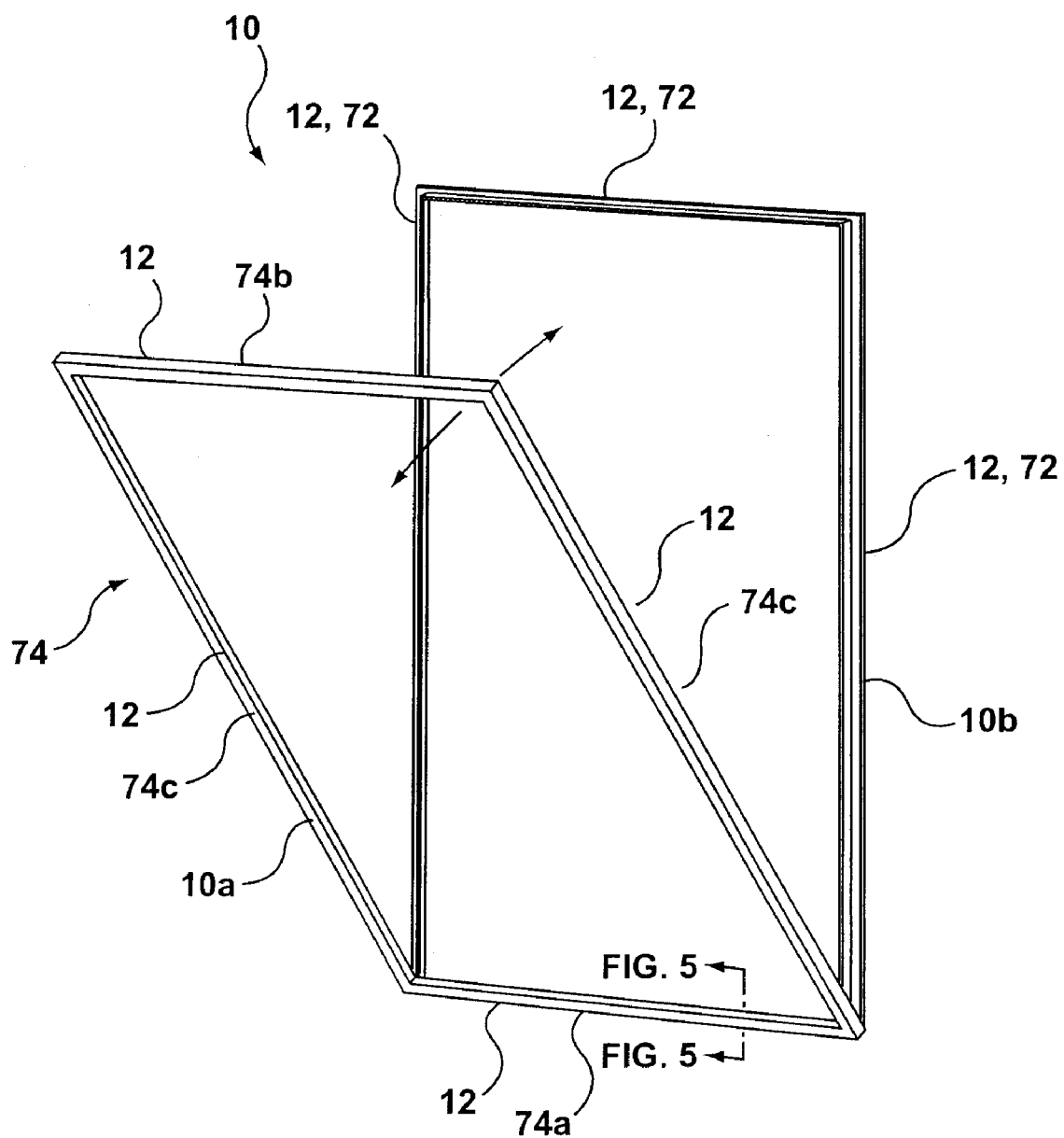
FIG. 7 shows a perspective schematic view of a frame assembly according to the invention.

Alternative embodiments of frame assemblies 10 and frame members 12 are shown in FIGS. 5-7. In the embodiments shown in FIGS. 5-7, assemblies 10 according to the invention comprise sets of mating frame members (or subassemblies) 12, 72, 74*a*, 74*b*, 74*c* (see e.g. FIG. 7) which may be held together, as for example when advertising is installed, by the interaction of flanges 76, 78 and/or other portions of the mating members, as well as suitable fasteners and/or adhesives. For example, at least some portions of a first frame subassembly 74 or 72 can comprise a hinge flange 78 adapted to be retained by a channel 79 provided in the second set of frame members or subassembly 72 or 74, so that the first set 74, 72 can be rotated with respect to the second set 72, 74. Other portions of the sets may comprise portions adapted to hold the mating sets in a closed juxtaposition. For example, one or more other members of the first and/or second frame sets may comprise detents 81 or other protrusions adapted for interference fit with one or more channels 83 when the assembled frame sets are placed in a closed disposition.

As shown in FIGS. 5-7, for example, a first frame set 74 can comprise one or more members 74*a* comprising hinge flanges 78 adapted to engage one or more channels 79 provided on members 12 of second frame set 72, which may be fastened to a wall or other structure as described herein. With the hinge flange(s) 78 engaged within channel(s) 79, the first frame set 74 can be rotated into an open position as shown in FIGS. 5 and 7. An advertising sheet, as for example a sheet 32*a* of polycarbonate having an image applied to a protected surface 34*b* thereof, may be placed in position within channel 36 formed by frame members' flanges 93, 95 of the members 12, and first frame subassembly 74 can be rotated into a closed position, in which detent(s) 82 of one or more frame members 12, 74*a*, 74*c* engage detent channel 83 to hold the two frame sets in a closed position, retaining advertising sheet 34*a* in a display position as shown in FIG. 6. Frame sets 74, 72 can also be maintained in a closed position by other means, such as for example by providing screws or other fasteners 97 adapted to engage flanges 76, 87 of members 74*b*, 72 as shown in FIG. 6*a*. Fasteners 97 may be countersunk, as shown, or otherwise hidden, and may comprise security/safety features such as tamper-proof or otherwise specialized driver means (e.g., special means for engagement of driving tools).

Figure 8:
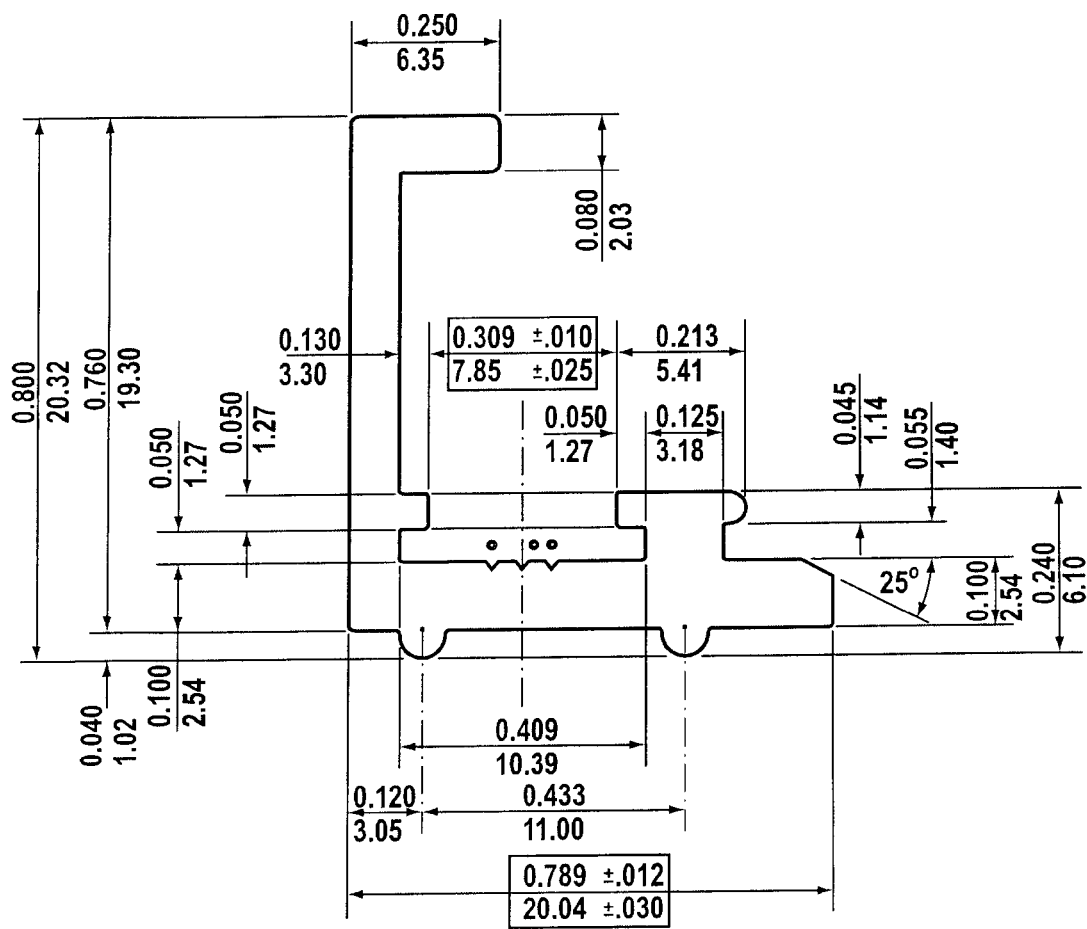
FIGS. 8-10 show cross sections of embodiments of frame members suitable for use in implementing the invention.
Figure 9:
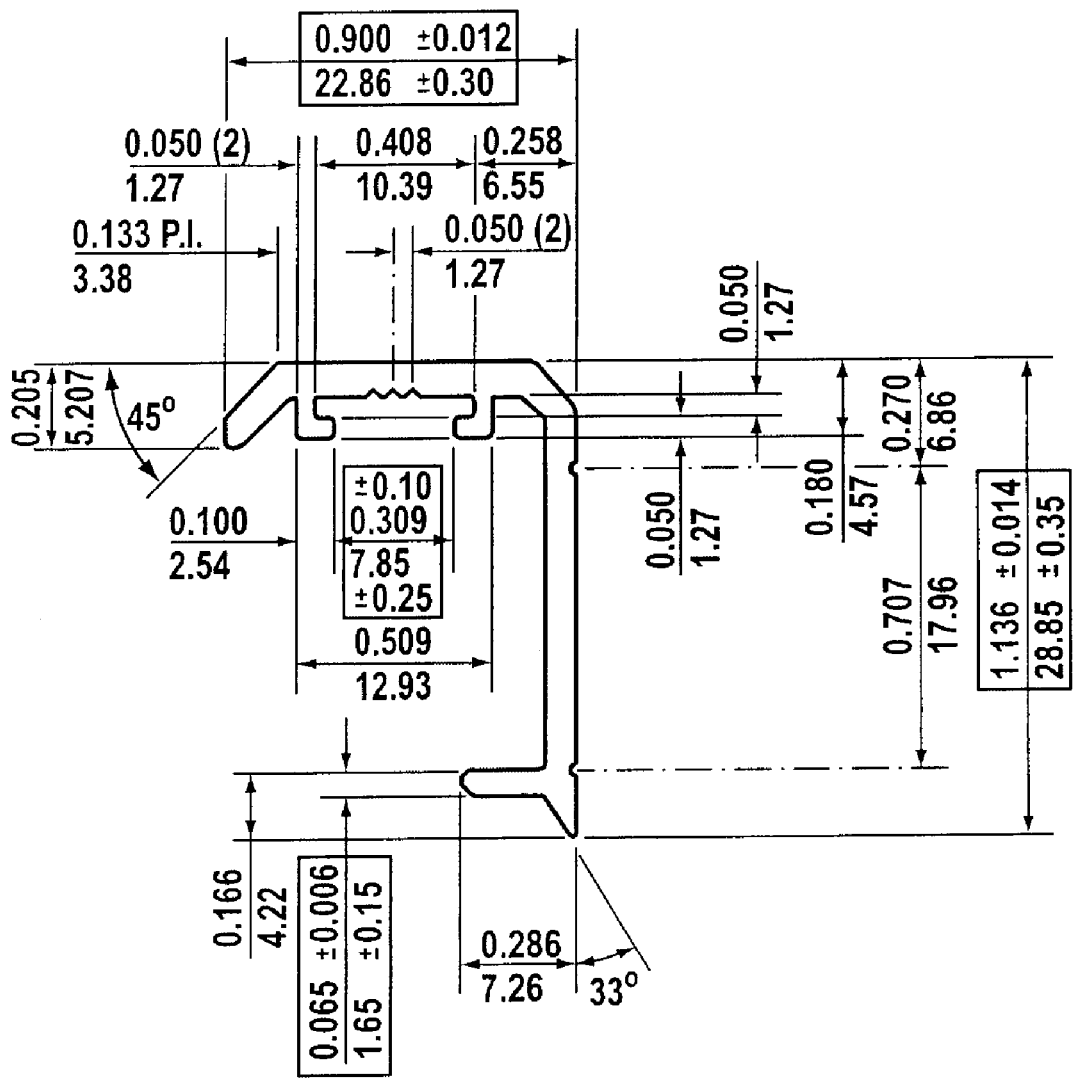
Figure 10:
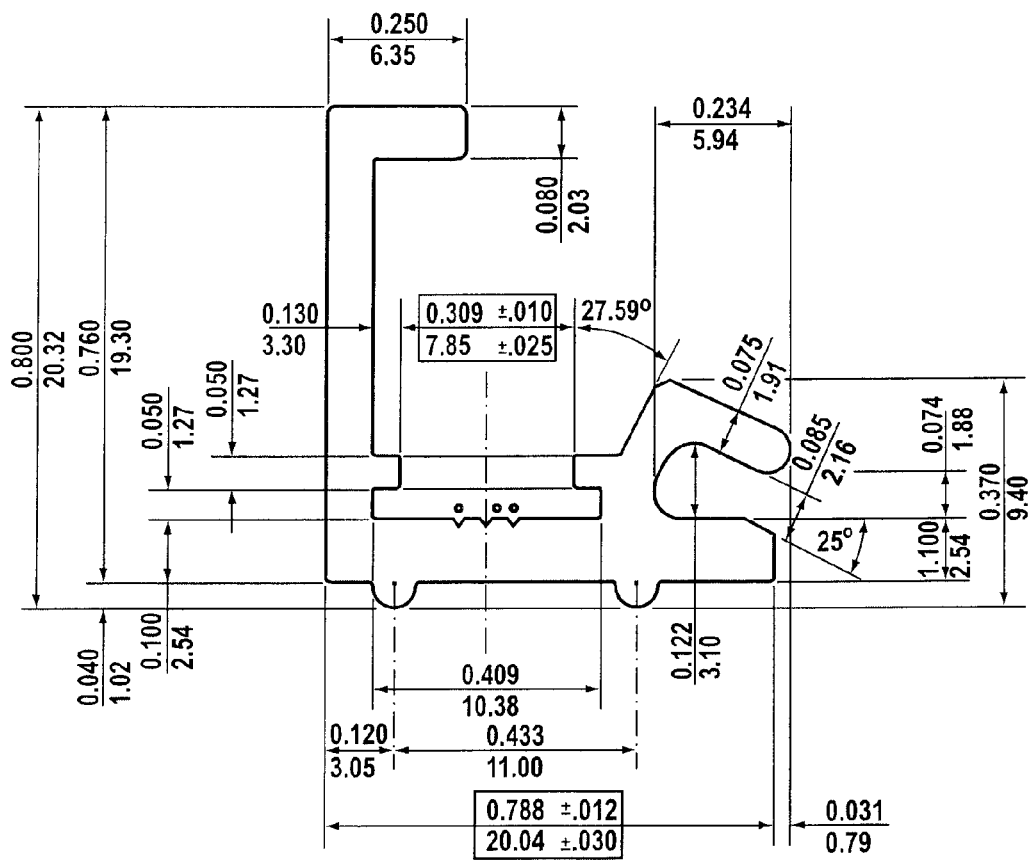
Figure 11:
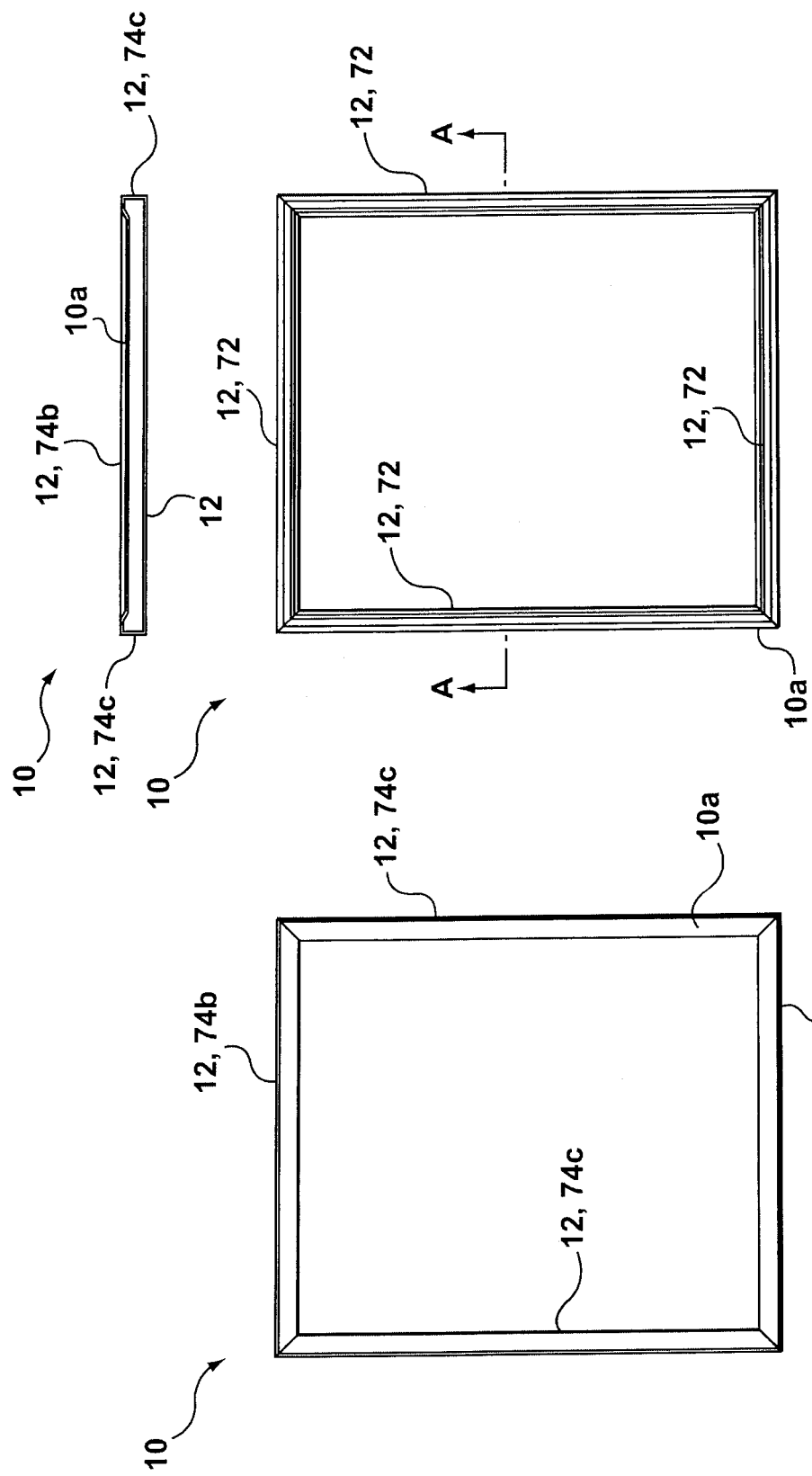
FIGS. 11-13 provide orthogonal views of a frame assembly according to the invention.
Figure 12:
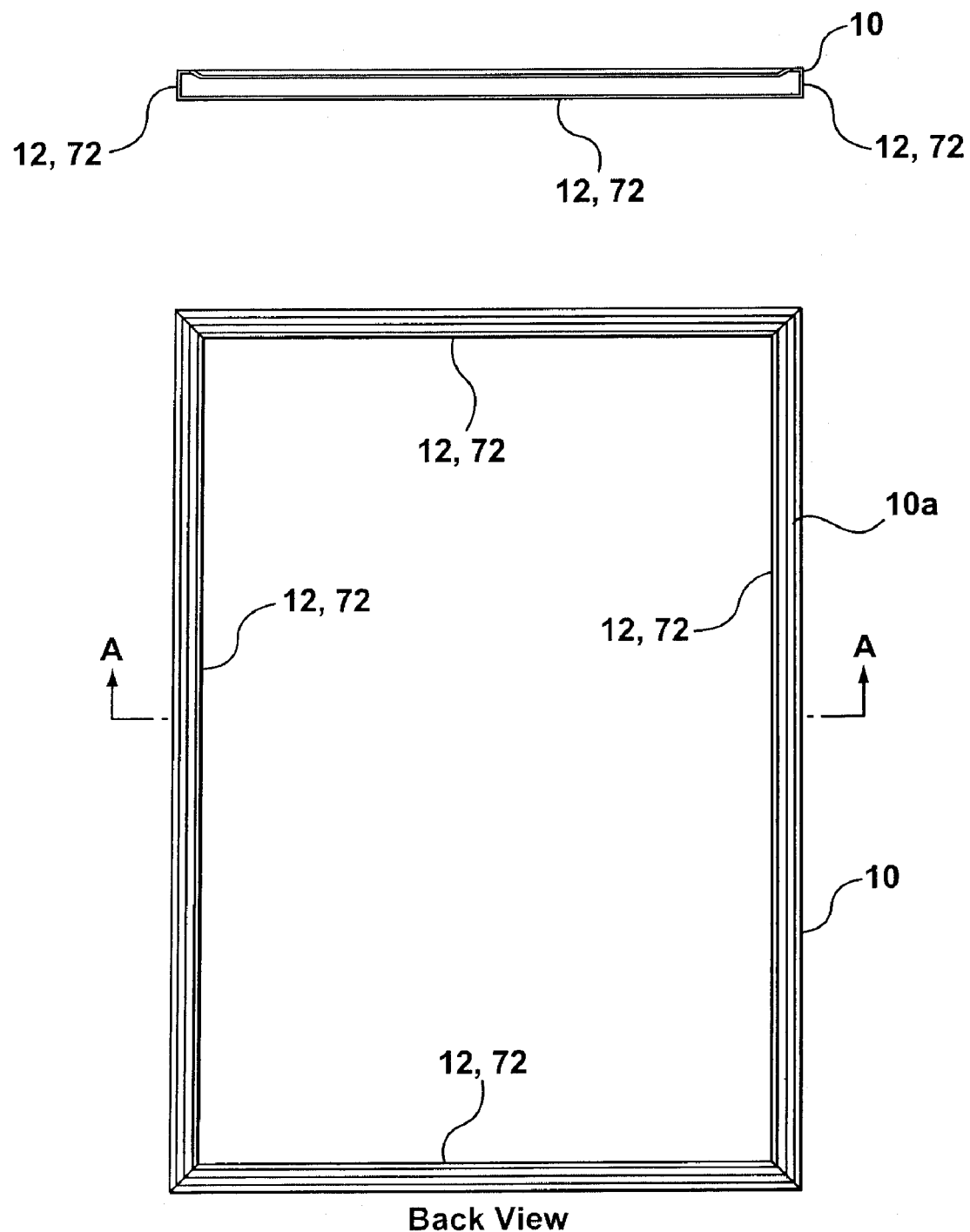
Figure 13:
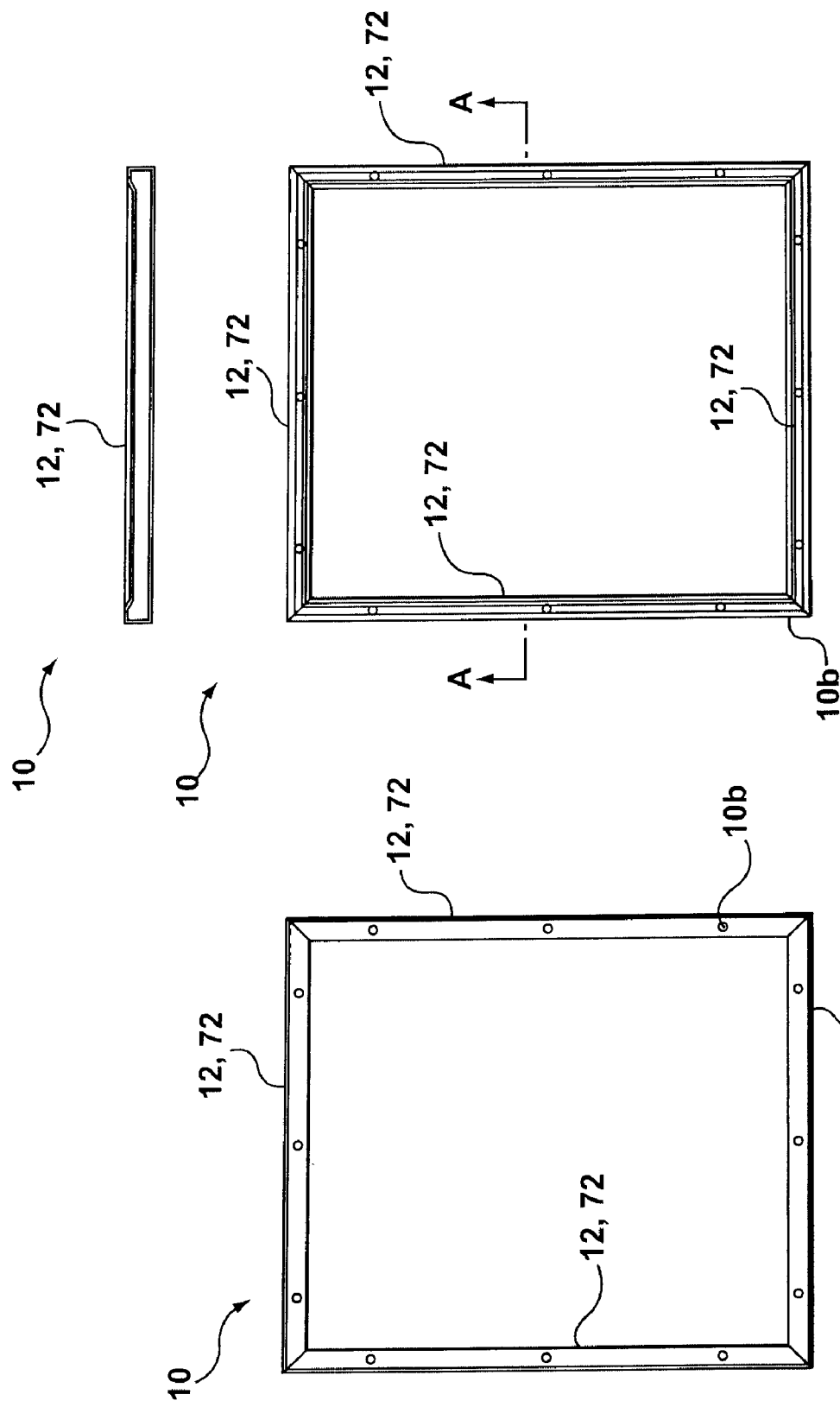

FIGS. 8-10 show cross sections of embodiments of frame members 12, 72, 74 suitable for use in implementing the invention, with dimensions for example embodiments of such members. FIGS. 11-13 provide orthogonal views of a frame 10 assembled using such frame members.

Additional embodiments of frame assemblies 10 and frame members 12 are shown in FIGS. 14-22. In the embodiments shown in FIGS. 14-22, assemblies 10 according to the invention comprise two frame sets or subassemblies, a front frame set 74 and a back frame set 77.

Figure 15A:
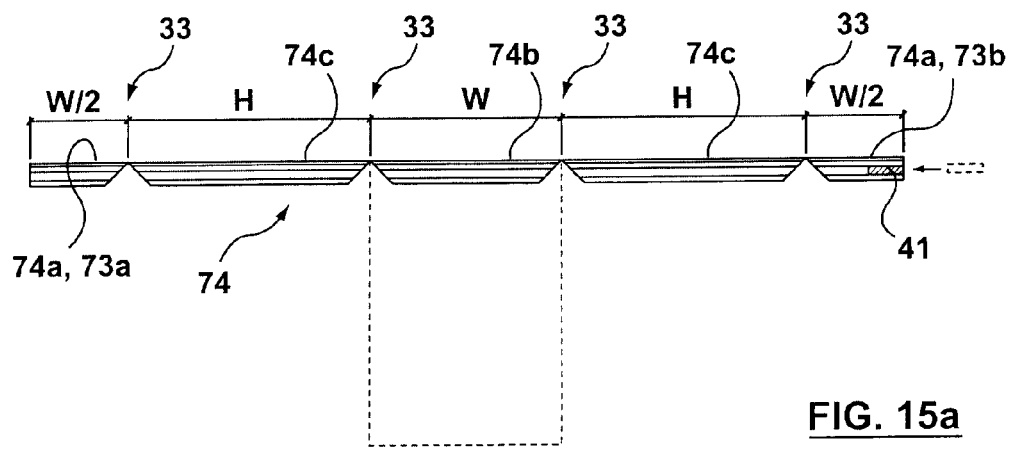
FIGS. 15a-15c show front views of front frame subassemblies according to the invention.
Figure 15B:
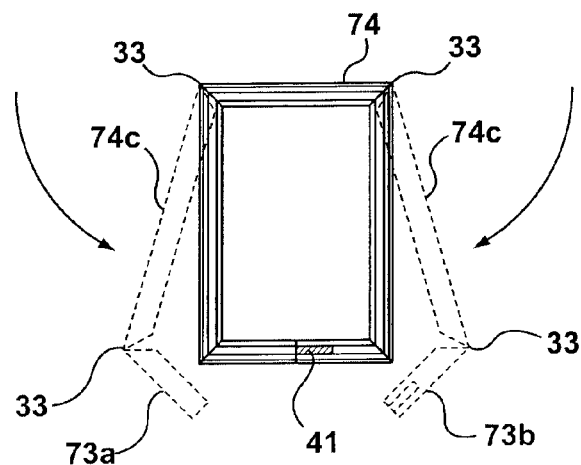
Figure 15C:
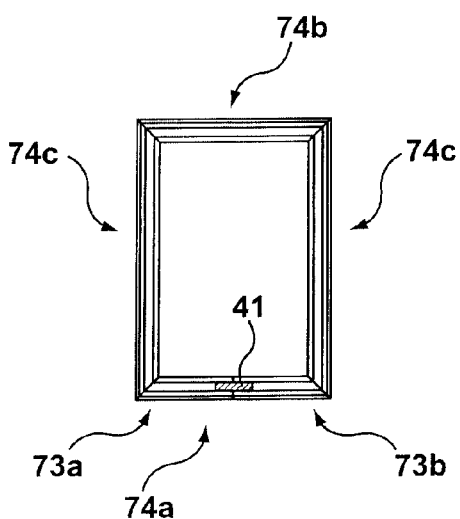

As shown for example in FIGS. 15a-15c, a front frame set 74 can comprise multiple integrally formed or distinct frame members, as for example one or more each to form a top (frame member 74b), sides (frame members 74c) and a bottom (frame member 74a) of the frame set 74. Frame member 74a can for example be split into two component parts, e.g., frame members 73a and 73b. Frame members 74c meet frame members 74b and 74a to form joints 33. Joints 33 function as hinges such that frame set 74 can be transformed from a rectangular shape, shown in FIGS. 14a and 15c, to a straight line, as shown in FIG. 15a.

Frame set 74 can be advantageously be manufactured from a single piece of extruded or other material, as for example by cutting, milling, or forming, such that it can be bent at joints 33 formed by relatively thin continuous portions of an outermost flange. This may for example offer advantages in terms of the ease and cost of manufacturing. Alternatively, the frame set 74 can comprise multiple separate pieces which may be attached by, for example, a hinging mechanism at joints 33, or by various forms of fasteners, as for example as described herein.

Frame set 74 can be advantageously provided or placed in a linear configuration, as shown in FIG. 15a, for purposes of manufacture, transportation and storage. For use as a display, frame member 74 can be placed in a closed rectangular position as shown in FIG. 15c, by for example bending or otherwise rotating the frame member about hinges or joints 33, as shown in FIG. 15b. Connecting plate 41, attached to frame member 73b, can be provided within a suitably-mated channel within members 74 moved subsequently into to a position engaging both members 73a and 73b, and can be attached to 73a such that frame set 74 will be secured in a closed position. When the frame set 74 again needs to be stored or transported, it can be opened by unattaching connecting plate 41 from frame member 74a, moving connecting plate 41 back into a position over frame member 74b, and separating frame members 73a and 73b, as shown in FIG. 15b, until the frame set is in a linear position, as shown in FIG. 15a.

Figure 16A:
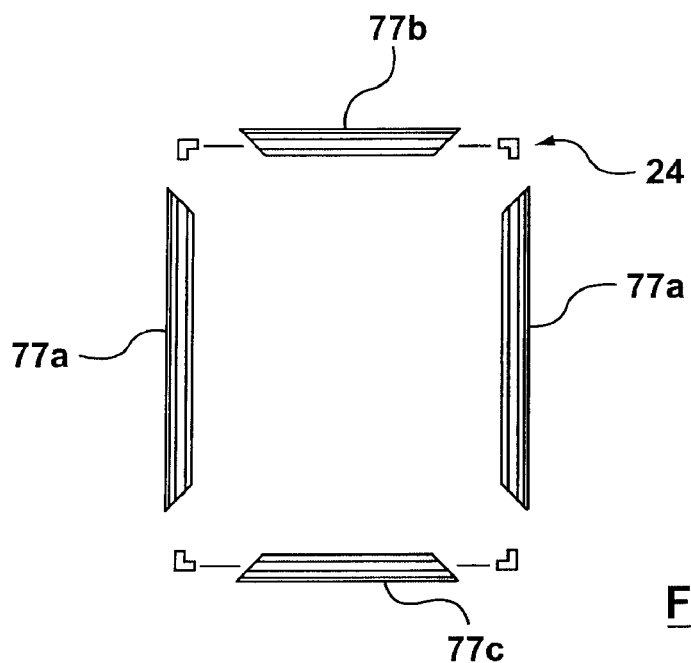
FIGS. 16a-16c show front views of rear frame subassemblies according to the invention.
Figure 16B:
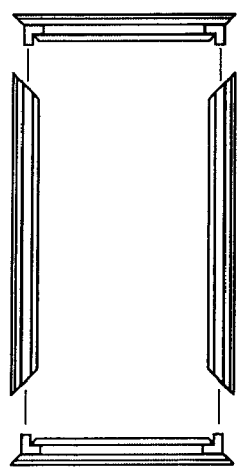
Figure 16C:
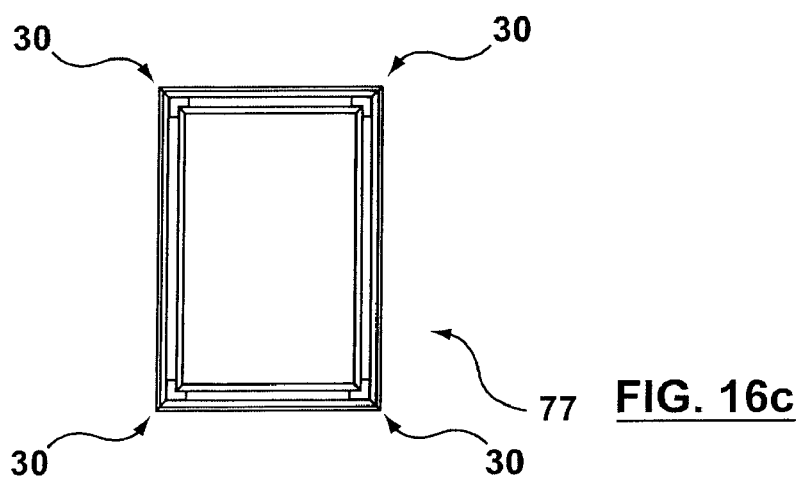

Back frame set or subassembly 77, shown in FIG. 16, can comprise four integrally-formed or distinct frame members forming a top (frame member 77b), sides (frame members 77a), and a bottom (frame member 77c) of the frame set 77. Frame members 77b and 77c meet frame members 77a to form joints 30, thereby forming a closed, generally planar configuration. When assembled, brackets 24 secure frame members 77a in an approximately 90 degree configuration. Brackets 24 may be securely crimped in place on frame members 77a, 77b, 77c, or may be secured by other means known in the art. While L-shaped brackets are shown, any type of suitable fastening hardware may be used. When frame members 77a, 77b, and 77c are secured together, frame set 77, as shown in FIG. 16c, is the result.

Figure 14B:
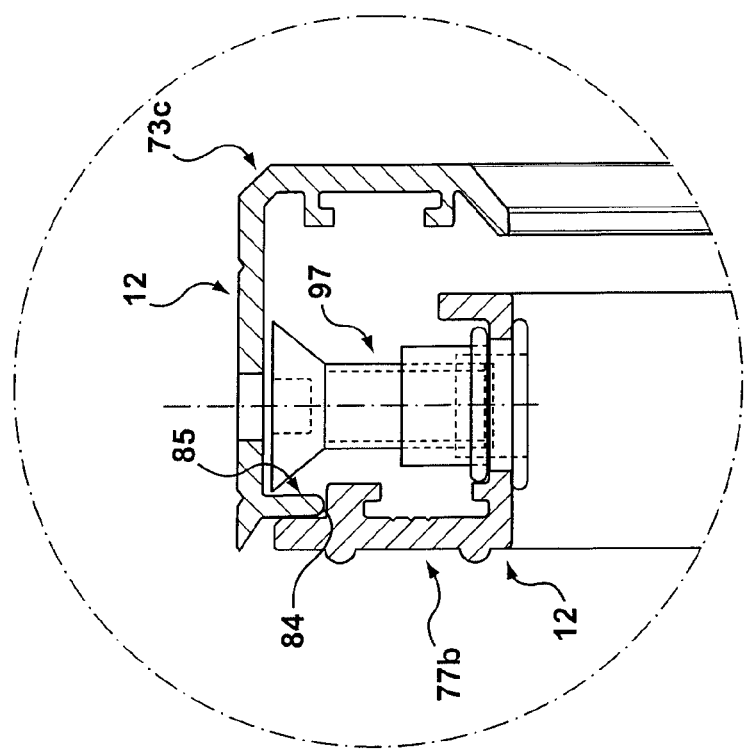
FIG. 14b shows a cross-sectional view of the top of a frame assembly according to the invention.
Figure 14A:
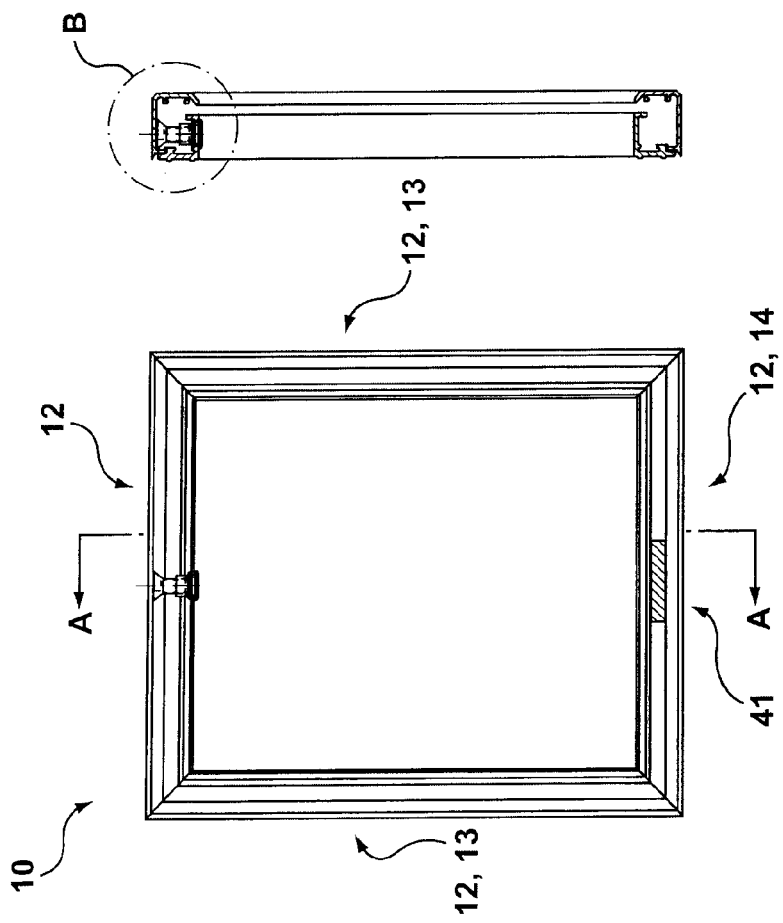
FIG. 14a shows a front and side view of a frame assembly according to the invention.
Figure 17:
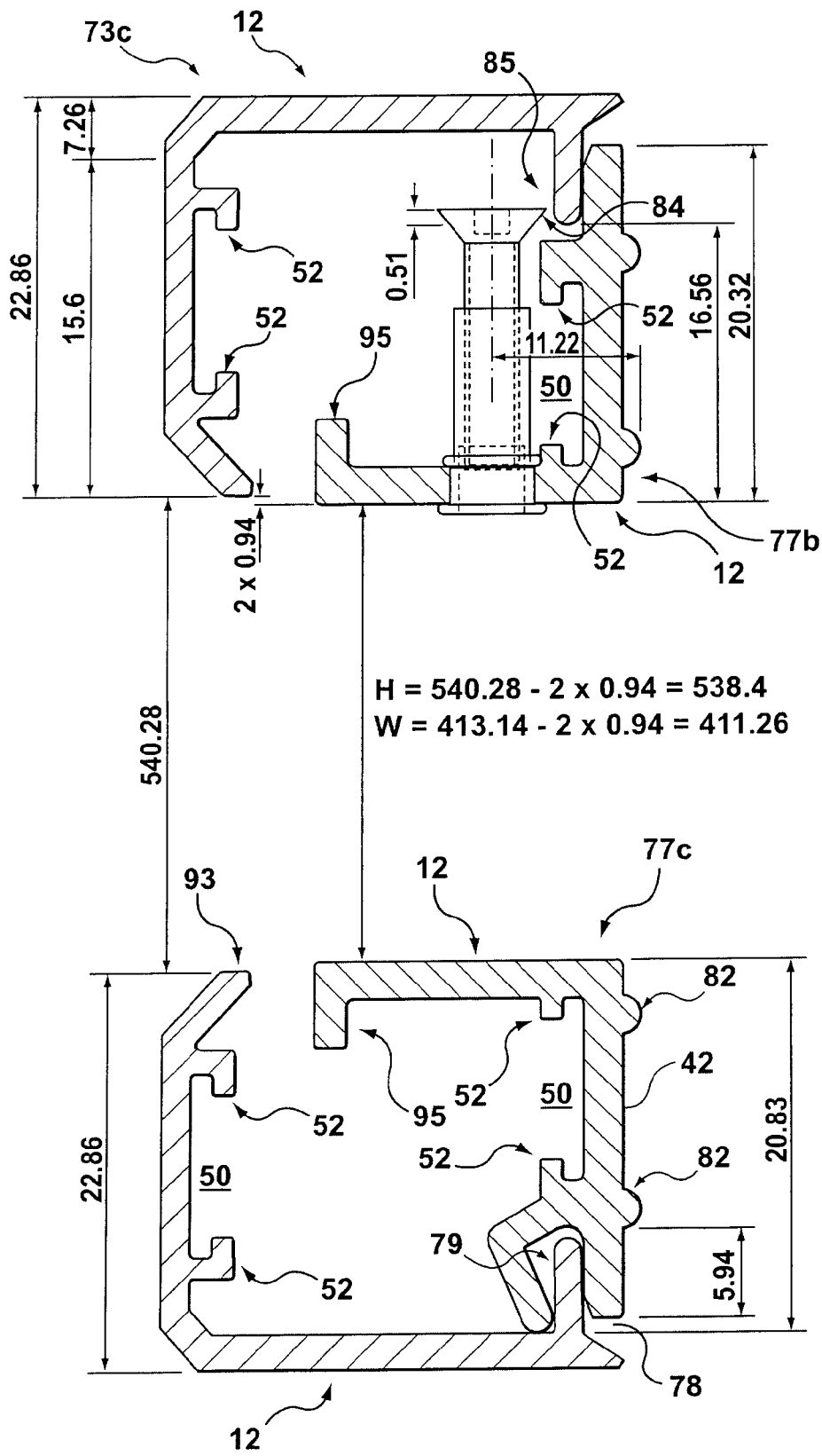
FIG. 17 shows a cross-sectional view of extruded frame members according to the invention.

When in use as a display, as for example when advertising is installed, frame set 74 of FIGS. 14-22 is typically in a closed position and frame members 74b and 77b may be held together by the interaction of one or more screws or other fasteners 97 and flanges 85, as shown in FIGS. 14b and 17. When a fastener 97 is in a relatively extended or upward position, it prevents flange 85 from moving forward. When the frame structure needs to be opened, such as when an advertising sheet 34a needs to be added, removed or replaced, the fastener 97 can be driven into the flange, or lowered, such that it will no longer interfere with flange 85. Frame set 74 can then be rotated forward, giving access to channel 36.

Figure 18:
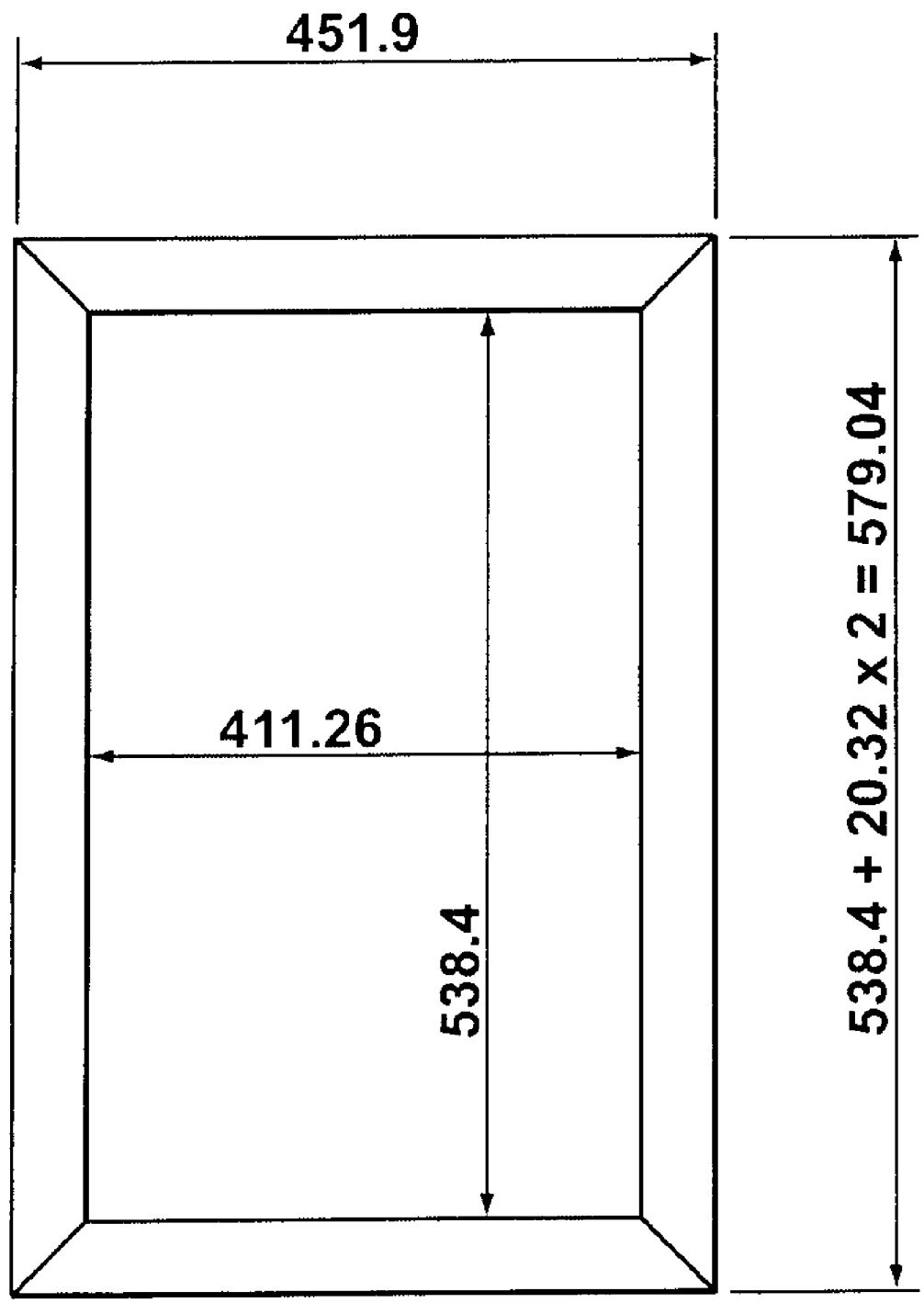
Figure 20:
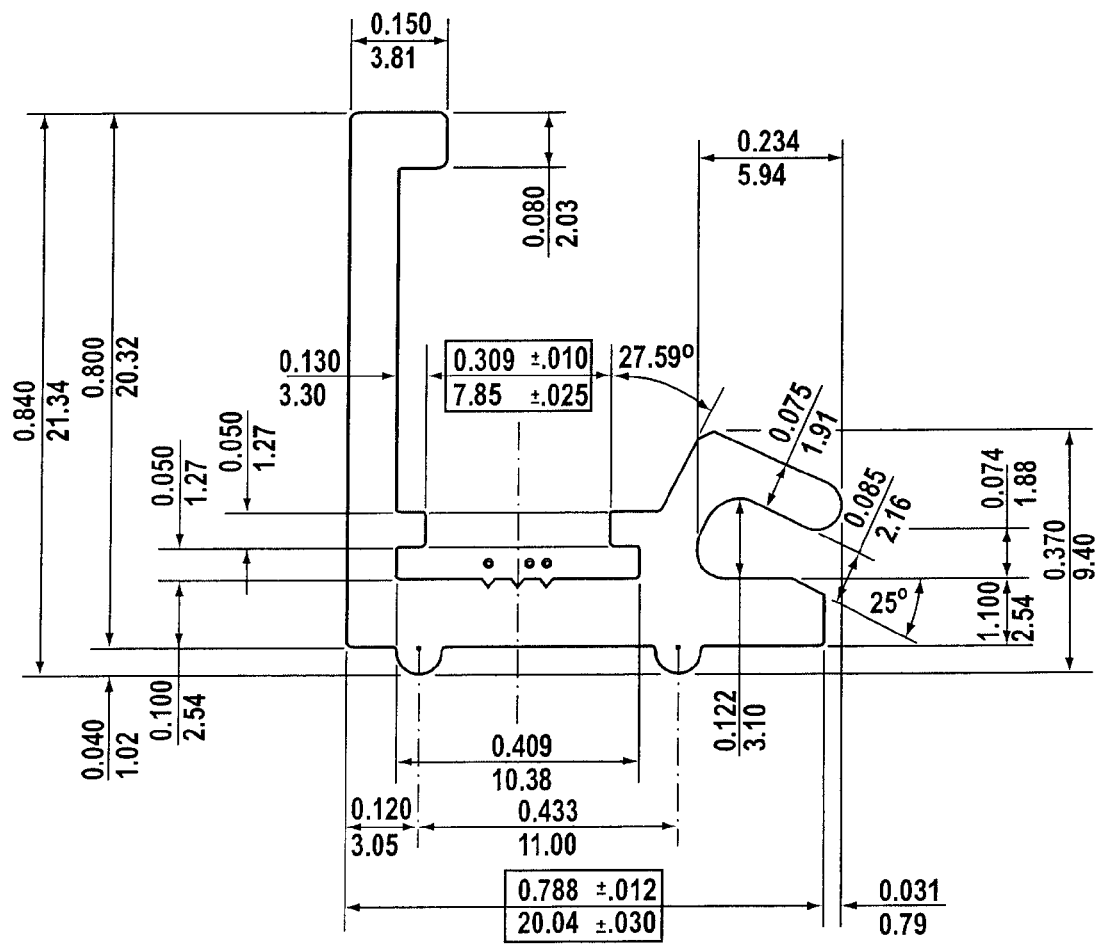
FIGS. 20-22 show cross sections of embodiments of frame members suitable for use in implementing the invention.
Figure 21:
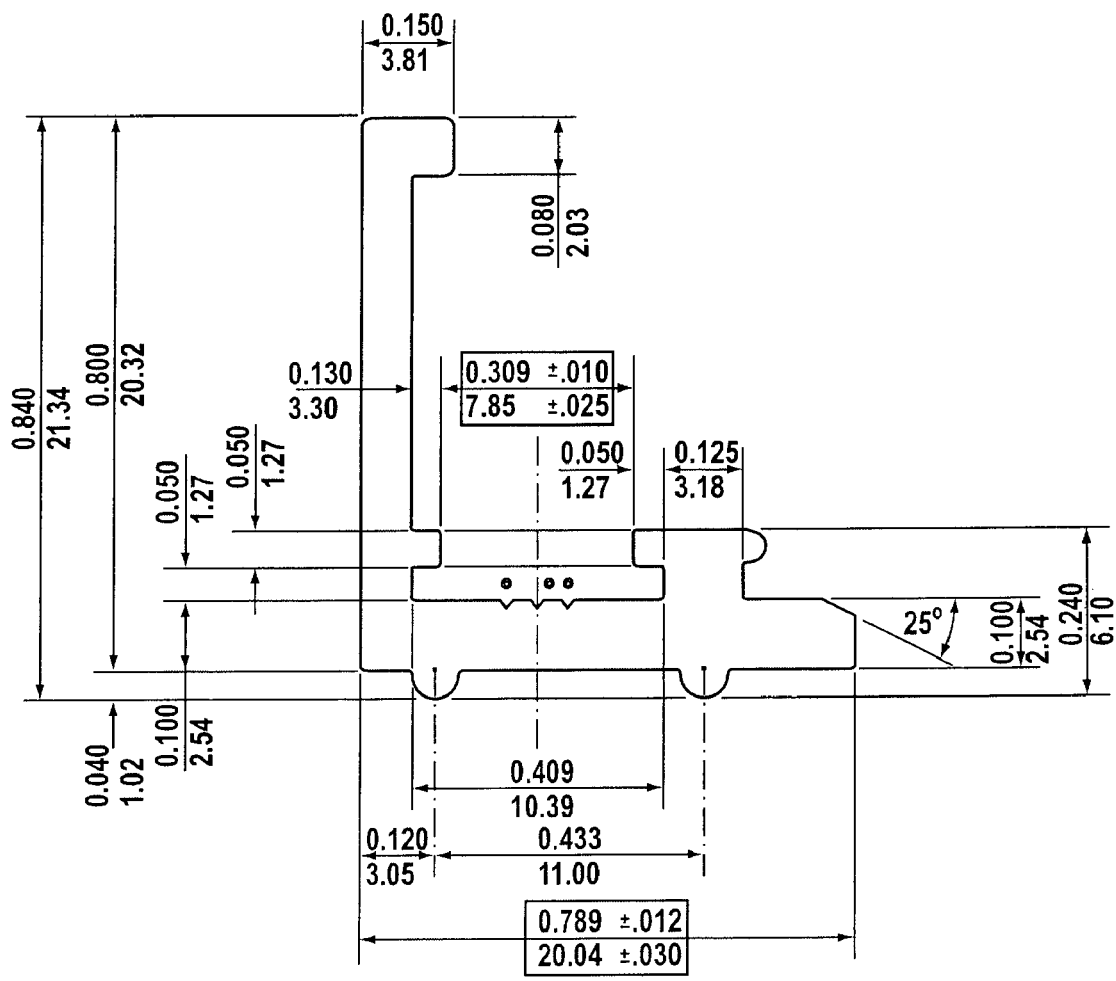
Figure 22:
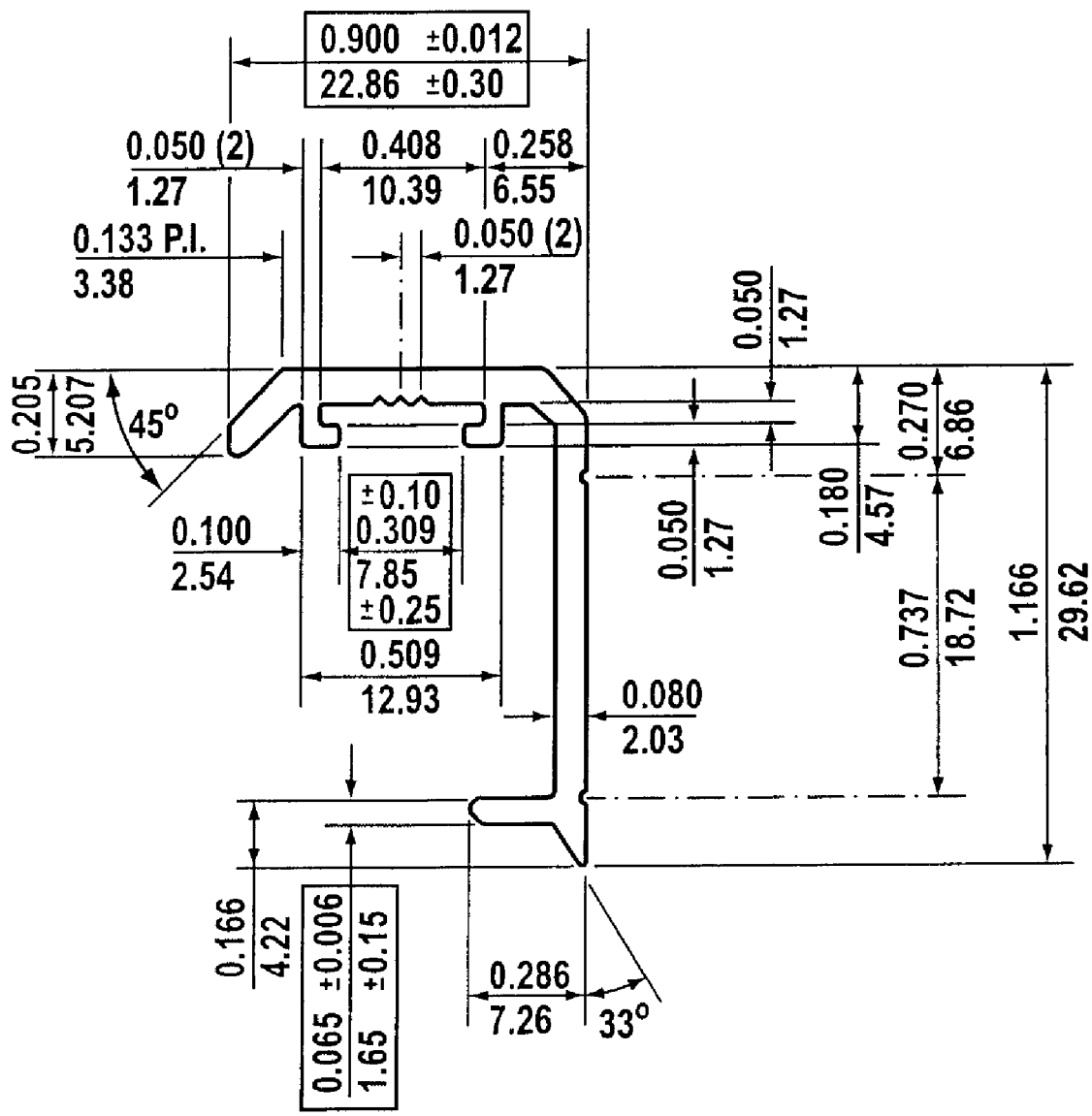

FIGS. 18-19 show front views of the frame assembly according to the present invention, with dimensions for example embodiments of frame members 74a, 74b, 74c, and 74d. FIGS. 19-22 show cross sections of embodiments of frame members suitable for use in implementing the invention, and in particular the embodiments shown in FIGS. 14-18.

Frames according to the invention are suitable for use with any advertising material in any locale, but provide particular advantage when used outdoors or within portable structures. Portable structures that are suitable include portable toilets (Port-a Potty, PolyJohn, etc), portable trailers, bus stops, etc. A preferred location to secure frame assembly 10 is inside a portable toilet, such as those used at construction sites or sporting events. A preferred location for the advertising is at the back of the inside of a portable toilet, so that a person wishing to use the portable toilet will see the advertisement upon entering it. Another preferred location is over a urinal of a portable toilet. Such positioning of frame assembly 10 enables, for example, an advertisement to be displayed to a user of the urinal.

As will be apparent to those skilled in the relevant arts, once they have been made familiar with this disclosure, frames and advertisements according to the invention may be installed efficiently in a wide variety of methods, as for example as shown in the incorporated references.

In order to install the frame into a structure, for example, an installer may begin with a pre-assembled frame 80. It is preferred that pre-assembled frame 80 is installed so that the top of the frame is substantially planar with the bottom of the frame and with the wall of the structure to which it is mounted. However, this is not a strict requirement. The installer will determine which of the plurality of openings 18 to use in securing the frame 80 to a wall of the structure so that the resulting frame assembly 10 will be substantially adjacent to the wall. The installer may then secures pre-assembled frame 80 to the wall through methods known in the art, or through other, new processes as for example described herein. The advertising material is then placed between front cover 32 and backing 34 and slid up through the bottom of pre-assembled frame 80 using front channel 36 so that the advertising material can be viewed. Frame member 12, 14 is then put in place and secured with fasteners 56 through openings 28 and 20.

Examples of frames 10 according to the invention adapted for use with portable toilets of any of several types currently commercially available in North America, including locations of openings 18, are shown in the incorporated references. Generally speaking, the location of openings 18 may be determined by a trial and error or another design process, depending on the dimensions of the portable structure to which the frame will be attached.

An installation kit may be provided in accordance with the present invention, comprising pre-assembled frame 80, frame member 12, 14, and two fasteners for reversibly securing frame member 12, 14 to pre-assembled frame 80. Optionally, front cover 32 and/or backing 34 is provided as part of the kit. Optionally, installation instructions are also provided.

A preferred embodiment of installation advertising material change instructions and an example of components of a kit is provided in the incorporated references.

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims.

The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described.

What is claimed is:

1. A frame for display of advertising in a portable structure, the frame comprising a plurality of connectable members; at least one of the members comprising means for attaching the frame to a surface of the portable structure and at least one of the members comprising a channel configured to support an advertising sheet; at least one of the members releaseably connected to at least one other of the plurality of members, so that an advertising sheet may be disposed in the channel.

2. The frame of claim 1, wherein the fastening means comprises at least one opening for passage of a fastener, the at least one opening located at a location on the at least one member determined at least partly based on the configuration of the surface to which the frame is to be attached.

3. The frame of claim 1, wherein at least one of the members comprises a portion offset from a portion of the member in such a location as to provide a space between the member and the surface to which the frame is attached when the frame is installed.

4. The frame of claim 1, wherein at least one of the members comprises an opening configured to allow drainage of a fluid from the frame as installed.

5. The frame of claim 1, further comprising a sheet configured for disposal within the channel and sized to fit within the frame when the plurality of members is connected.

6. The frame of claim 5, wherein the sheet comprises a surface bearing an advertisement.

7. The frame of claim 5, wherein the sheet is translucent.

8. The frame of claim 7, wherein the channel is configured to support the translucent sheet and an advertisement.

9. The frame of claim 1, wherein a least two of the plurality of members is formed is of a single part configurable into a plurality of members by bending.

10. A frame for display of advertising in an associated portable structure, the frame comprising:

a first frame set comprising at least one first member comprising means for attaching the first frame set to a surface of the associated portable structure, at least one second member on an end of the first frame set and comprising a first flange configured to support an associated advertising sheet, and at least one third member on an end of the first frame member opposite the at least one second member, the at least one third member defining a channel;

a second frame set comprising a means for rotatably engaging the first frame set including at least one hinge flange on an end of the second frame set configured to extend into the channel of the first frame set to selectively permit relative rotation between the first and second frame sets, and a detent channel configured to selectively receive the at least one third member of the first frame set to selectively hold the first and second frame sets in a closed position, at least one second flange on an end of the second frame set opposite the hinge flange, the first flange of the first frame set and the second flange of the second frame set defining an advertising support channel for supporting the associated advertising sheet.

11. The frame of claim 10, wherein the means for attaching comprises at least one opening configured to selectively receive an associated fastener, the at least one opening located at a location on the at least one first member determined at least partly based on the configuration of the surface to which the frame is to be attached.

12. The frame of claim 10, wherein at least one of the frame sets comprises a plurality of members formed of a single part and configurable as a plurality of members by bending.

13. The frame of claim 10, wherein the means for rotatably engaging the first frame set comprises a flange on one frame set adapted to engage a mating structure on the other frame set.

14. The frame of claim 10, wherein the means for rotatably engaging the first frame set comprises a hinge.

15. The frame of claim 10, wherein at the first frame set comprises at least one member having a portion offset from a portion of the member in such a location as to provide a space between the member and the surface to which the frame is attached when the frame is installed.

16. The frame of claim 10, wherein at least one of the frame sets comprises at least one member comprising an opening configured to allow drainage of a fluid from the frame as installed.

17. The frame of claim 10, further comprising an advertising sheet.

18. The frame of claim 17, wherein the advertising sheet bears an advertisement.

19. The frame of claim 17, wherein the sheet is translucent.

* * * * *